A. ST. ONGE.
BEATER FOR COTTON PICKERS.
APPLICATION FILED NOV. 22, 1920.
1,403,975. Patented Jan. 17, 1922.
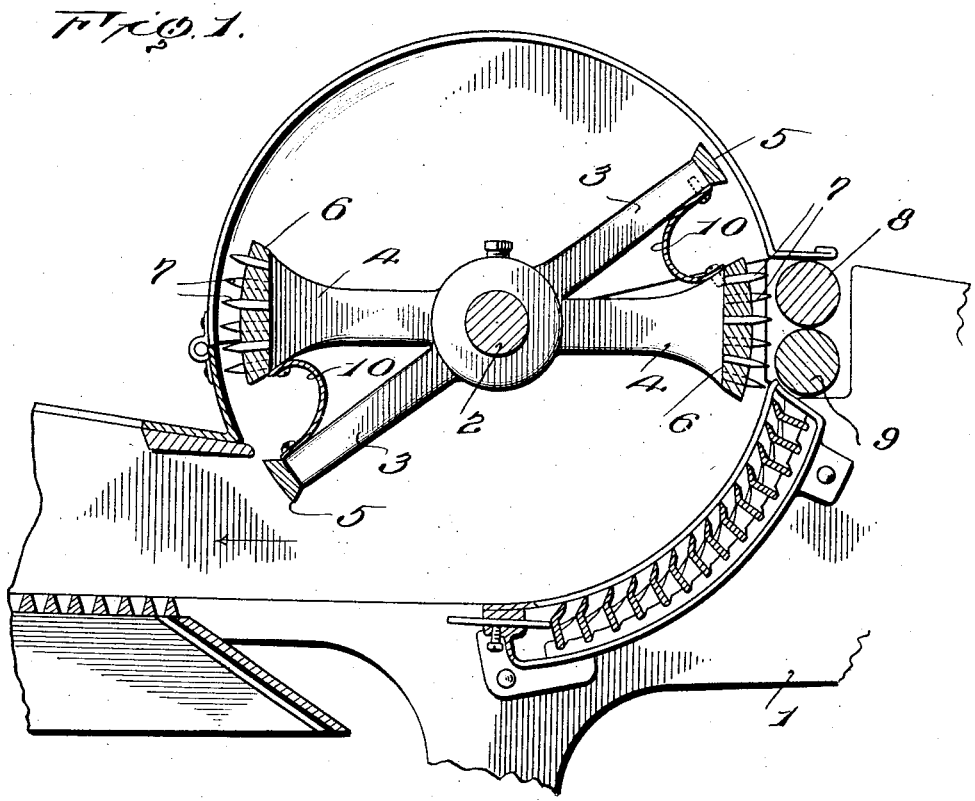
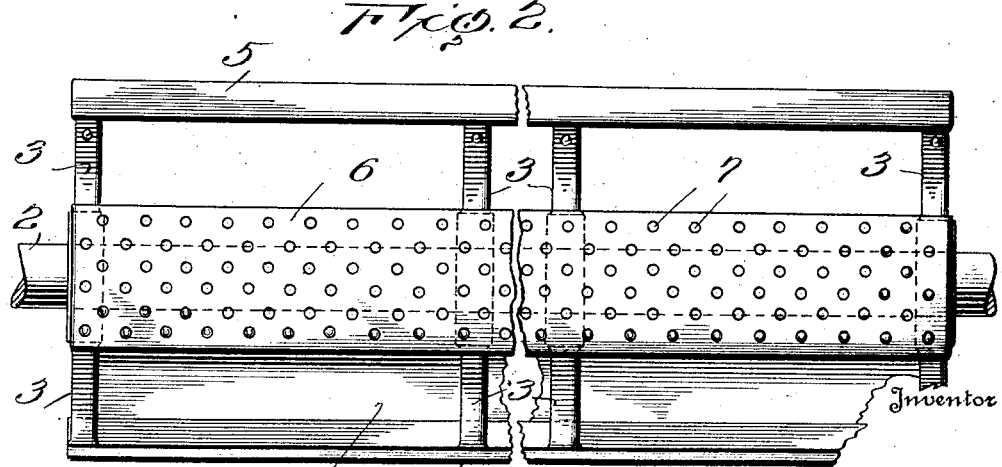

UNITED STATES PATENT OFFICE.

AMASA ST. ONGE, OF PROVIDENCE, RHODE ISLAND.

BEATER FOR COTTON PICKERS.

1,403,975.  Specification of Letters Patent.  Patented Jan. 17, 1922.

Application filed November 22, 1920. Serial No. 425,789.

*To all whom it may concern:*

Be it known that I, AMASA ST. ONGE, of Providence, in the county of Providence and State of Rhode Island, have invented certain new and useful Improvements in Beaters for Cotton Pickers; and I do hereby declare the following to be a full, clear, and exact description of the invention, such as will enable others skilled in the art to which it appertains to make and use the same.

My invention relates to cotton pickers, and particularly to devices employed for opening and combing the cotton so as to clean the staple in its progress to the spinner. The object of the invention is to provide a simple and highly efficient beater which will effectively open up the cotton and then shake out the dirt without in any way weakening the staple or creating waste, my improved beater being adapted to first shred the cotton as it is feeding in the usual manner and to then immediately strike it a gentle blow to dislodge foreign matter.

In the drawings, Figure 1 is a vertical sectional view taken transversely of the power shaft and showing feed rolls, grids, and second grids, stripping plate and bonnet of conventional form. Figure 2 is a front elevation of my improved beater, one of the shield members being removed.

I have indicated a supporting frame 1 and at 2 is shown a shaft adapted to be suitably power driven. Fixed to this shaft are a plurality of pairs of arms 3 and 4, the arms 3 forming the support for beater bars 5, these arms and bars constituting what I shall term the plain beater. The arms 4 are the support for cross pieces 6 from the surface of which project pins 7, and are termed the pin beater. The arms of each pair 3 and 4 are in alinement, but the respective pairs of arms are on different radii, complementary arms of each pair, that is to say, an arm 3 and an arm 4 are arranged with a slight intervening space of less than ninety degrees, between them so that upon the clockwise revolution the pin beater will engage the cotton staple slightly in advance of the blow on the latter from the plain beater, the engagement of these two arms with the staple occurring at the point of feed of the latter between the rollers 8 and 9. In order that the suction in the machine shall not effect a drawing of the staple between the pin beater and the plain beater, I bridge the space between the complementary pairs of beaters with a shield 10, preferably of sheet metal.

The operation of my improved beater will be apparent and the advantages resulting from first opening up the cotton by engagement of the pin beater therewith and the subsequent quick beating of the cotton so combed which effectively loosens all foreign matter are manifest. A picker embodying features of the improved type herein disclosed may be operated with a great saving of power, the speed at which the beater must revolve being less than that where but a plain beater or a pin beater is alone employed, and my improved beater insures removal of more dirt from the staple and this means better running work and less waste.

I claim as my invention:

1. A beater for cotton pickers including a rotatable shaft, and pairs of beaters secured to said shaft and adapted to rotate therewith, one beater of each pair having a pin surface, said pin surface beaters being diametral.

2. A beater for cotton pickers including a rotatable shaft, and pairs of beaters secured to said shaft and adapted to rotate therewith, the surface of one beater of each pair being plain and its complementary beater having a pin surface, like beaters being diametral and the pin and plain beaters of each pair being in spaced relation of less than ninety degrees to each other.

3. A beater for cotton pickers including a rotatable shaft, and pairs of beaters secured to said shaft and adapted to rotate therewith, the surface of one beater of each pair being plain and its complementary beater having a pin surface, like beaters being diametral, the pin and plain beaters of each pair being in spaced relation to each other, and a shield bridging the space between the pin and plain beater of each pair.

4. A beater for cotton pickers including a rotatable shaft, a plurality of pairs of arms extending radially from said shaft, bars supported by the arms of one of said pairs, cross pieces supported by the arms of the complementary pair, complementary pairs of arms being less than ninety degrees apart, pins projecting from said cross pieces, and a shield spanning the space between the bar and cross piece of each pair.

In testimony whereof I have signed this specification.

AMASA ST. ONGE.